April 7, 1959  J. MILLAR, JR  2,881,017
COUPLING FOR TUBING
Filed Oct. 11, 1956

INVENTOR
JOHN MILLAR, JR.
BY Cameron, Kerkam & Sutton
ATTORNEYS

United States Patent Office 2,881,017
Patented Apr. 7, 1959

2,881,017

COUPLING FOR TUBING

John Millar, Jr., Harrisburg, Pa.

Application October 11, 1956, Serial No. 615,366

7 Claims. (Cl. 287—54)

This invention relates to a non-weave, interlock joint or coupling for tubing, pipe or rods, the joint being designed to maintain the coupled sections rigidly in union and to positively prevent weave or relative movement therebetween.

The coupling is particularly designed for the handles or control bars of wheeled implements which must be demounted for packing and shipment and is designed for rapid assembly and disassembly. It may be used wherever a positive coupling is required between two tubular members.

In the past many such couplings have been suggested in the art, most of which were complicated mechanical structures requiring special machinery for their formation and which lacked the required strength or which tended to loosen rapidly, thus defeating the purpose for which they were designed.

The present coupling obviates many of the disadvantages of prior connections of this type, is simple of formation and readily assembled and disassembled and results in a union between the tube or rod sections which is permanently rigid and non-weaving and which is actually stronger than the body of the tubing itself.

The present invention is readily adaptable to both curved and straight tube or rod sections. It contemplates a bending and concaving of the corresponding extremities of the tubing to provide them with analogous concave terminal sections and the futher provision of internal, mating shoulders at the inner extremities of the concave sections, the concave extremities being of the same cross-sectional curvature as the tube sections so as to closely fit or mate with the outer curved surfaces thereof. Once the two extremities of the tubing are thus mated appropriate bolts or other fastening means are set through aligned bores therein to maintain the joint in permanent, non-weave condition. Due to the comparative simplicity of the novel structure the mating sections may be readily separated merely by the removal of the aforesaid bolts.

It is therefore a primary object of this invention to evolve a simplified and improved non-weave joint for the extremities of tubing sections which is completely rigid and of great strength and which is readily disassembled.

It is a further object of this invention to provide improved terminal structure at the extremities of tubing sections which will make them readily matable to provide such a permanent non-weave joint.

It is a further object of this invention to evolve such a non-weave joint which is readily adaptable to all types of pipe and tubing and which may also be adapted to rod sections.

Other and further objects of this invention will become apparent as this specification proceeds.

In the drawing, Fig. 1 is a perspective view of two rectilinear tube sections joined by the novel non-weave coupling of the present invention;

Figure 1:
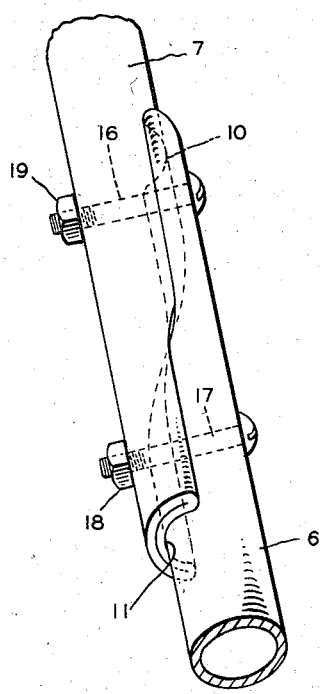

Referring to the drawing, 6 and 7 designate two rectilinear tubing sections which are joined by the coupling of the present invention. Sections 6 and 7 are preferably concaved at their outer extremities 8 and 9 for an appreciable distance from the end to provide concave troughs or channels 10 and 11 at their outer extremities. Channels 10 and 11 are preferably of the same cross-sectional curvature as body sections 12 and 13 of members 6 and 7, over which concave extremities 10 and 11 are respectively designed to fit closely. At their inner extremities concave sections 10 and 11 are preferably provided with shoulders 14 and 15 of corresponding curvature, as shown in Fig. 3, which are designed to closely fit each other when the coupling is assembled.

Concave outer sections 10 and 11 of the tubing 6 and 7 are preferably formed by forcing the outer wall of the tubing inwardly into close bearing relationship with the opposed wall of the tubing to provide a concave section at the extremity of the tubing which will fit closely over the outer periphery of the cylindrical body sections of the respective tube sections 6 and 7 and which will extend thereover an appreciable distance.

The mating sections of the coupling when fitted together are maintained in union by bolts 16 and 17 and nuts 18 and 19, aligned holes 20 and 21 being provided through the body 12 of tube section 6 and hole 22 being provided through the outer surface of concave terminal section 11 of tube member 7 for passage of bolt 17, these holes being so disposed in the tube sections that when the sections are assembled holes 20, 21 and 22 are in alignment for the passage of bolt 17. Similarly, the outer concave extremity 10 of tube section 6 is bored at 23 and the corresponding cylindrical body section 13 of tube member 7 is bored at 24 and 25 for the passage of bolt 16. These holes or orifices 20, 21 and 22 and 23, 24 and 25 are so disposed in the respective tube sections that when the sections are mated with concave extremities 10 and 11, respectively, fitted downwardly over cylindrical body sections 12 and 13 and shoulders 14 and 15 in close engagement the holes will be in rectilinear alignment to allow passage, respectively, of bolts 17 and 16.

Figure 3:
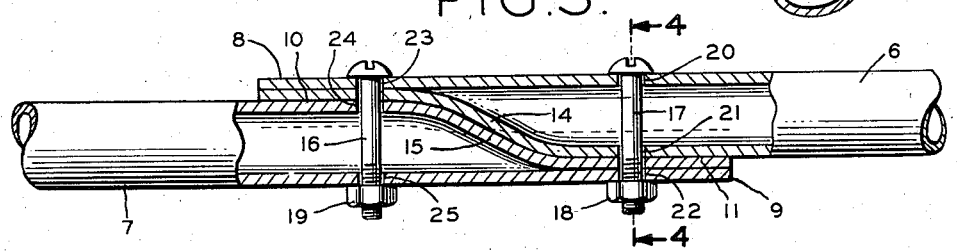
Fig. 3 is a side elevation of the coupling, partially in cross-section, showing the two tubing sections joined.

With the tube sections firmly in mating engagement, with shoulders 14 and 15 in close bearing relationship and with concave extremity 10 of section 6 fitted closely over body section 13 of tubing 7 and with concave extremity 11 of tubing 7 fitted closely over body section 12 of tubing 6, the holes in the respective sections being in alignment with bolts 17 and 16 passed respectively through holes 20, 21 and 22 and 23, 24 and 25, nuts 18 and 19 are then applied over the extremities of bolts 17 and 16 and turned down tightly to provide a close permanent union, as shown in Figs. 1 and 3.

It will be noted that the lateral extremities of concavities 10 and 11 fit downwardly an appreciable distance over the outer peripheries of cylindrical body sections 12 and 13 of tubings 6 and 7 whereby when the respective concave sections are so fitted over the body sections of the corresponding tubing a firm and non-weaving joint will be formed. As shown in Fig. 3, curved shoulders 14 and 15 at the inner extremities of concavities 10 and 11 meet and closely fit together to further strengthen and reinforce the mated joint between the tubing extremities.

Figure 5:
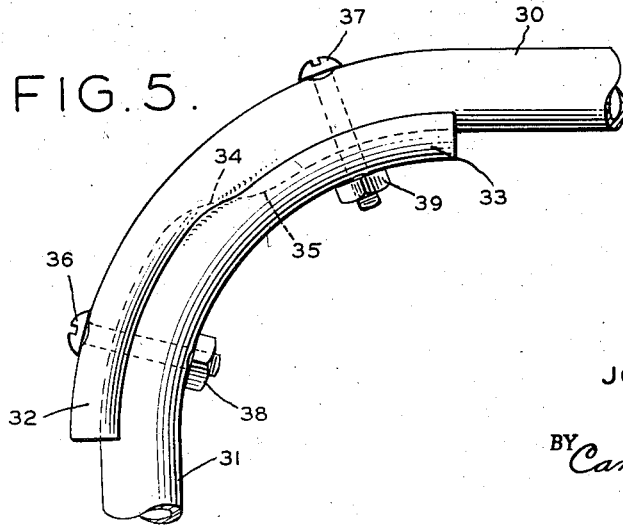
Fig. 5 is a perspective view of a similar coupling formed between the extremities of two curved tubing sections.
Figure 4:
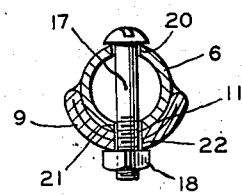
Fig. 4 is an end view of the coupling, taken on line 4—4 of Fig. 3, showing the sections in juncture.

Another embodiment of the invention is shown in Fig. 5 in which it is applied to curved tube sections. This joint is formed in the same fashion as that disclosed in Figs. 1–4 with the exception that the tube sections are curved through an arc of some 90°.

In this embodiment of the invention the extremities of tubing sections 30 and 31 are similarly curved to the desired arc, as shown, the outer extremities of the sections being concaved at 32 and 33 similarly to the concaved extremities illustrated in the rectilinear embodiment of the invention shown in Figs. 1–4. Inner shoulders 34 and 35 are provided respectively at the inner extremities of concavities 32 and 33 and as shown in Fig. 5 are designed to meet closely together at the inner extremities of concavities 32 and 33.

The respective tube sections are appropriately bored adjacent the extremities of the coupling to allow passage of bolts 36 and 37 through both tube sections, bolts 36 and 37 being provided at their extremities with nuts 38 and 39. The holes or bores in the tubing sections are so disposed that when the curved concave extremities 32 and 33 of the tubing sections are closely fitted over the respective cylindrical curved body portions of tube sections 30 and 31, with inner shoulders 34 and 35 thereof in close mating relationship, the three holes in each of the sections are respectively aligned to allow free passage of bolts 36 and 37, as previously described in detail in connection with the rectilinear embodiment of the invention shown in Figs. 1–4.

Here again it will be seen that the lateral edges of the concave extremities 32 and 33 fit downwardly an appreciable distance over the cylindrical outer curved surfaces of the body portions respectively of tube sections 31 and 30 to such distance that a firm and non-weaving, mating joint is formed therebetween when the sections are assembled with inner shoulders 34 and 35 in close bearing relationship with each other.

This embodiment of the joint or coupling may be adapted to many degrees of curvature, the only requirement being that both curved tube extremities must be bent to the same arcuate angle in order that a close, mating joint may be evolved therebetween.

The coupling or joint of this invention is so designed that the two mated extremities may be readily and easily fitted into interlocking engagement with each other merely by bringing the two sections into juxtaposition and sliding one upon the other, with the respective concave extremities fitting downwardly over the corresponding cylindrical body portions until the inner shoulders at the inner extremities of the concave outer sections are in close engagement and the concave extremities are fitted closely over the cylindrical body sections. Insertion of the bolts through the aligned holes in the mating sections and application of the nuts to the extremities of the bolts will result in a rigid and non-weaving union between the two tube sections.

When it is desired to disassemble the coupling to remove the outer portion of a handle, or for whatever purpose, it is merely necessary to remove the nuts from the extremities of the bolts, withdraw the bolts and the two sections come freely apart. The same is true for the curved embodiment of the invention which is also readily assembled and disassembled, as aforesaid.

Figure 2:
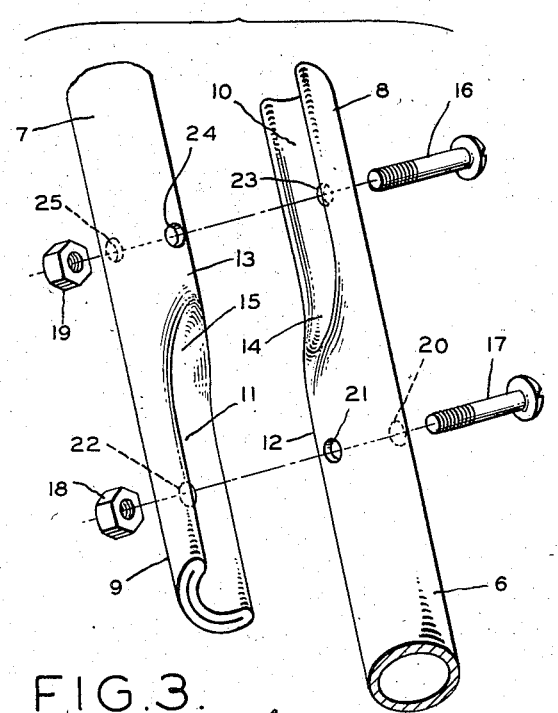
Fig. 2 is an exploded perspective view of the two tubing sections in position for juncture and showing the bolts and nuts aligned with the holes therein for insertion therethrough upon juncture of the two sections.

By providing the mating shoulders at the inner extremities of the concave ends of the tube sections it is merely necessary, in assembling the coupling, to apply the two sections over each other, as shown in Figs. 1 and 2, and then slide them inwardly on each other until the inner shoulders are in close engagement with each other and the concave extremities are closely fitted over the corresponding body sections of the opposed tube sections.

This invention is susceptible of numerous embodiments without departing from the spirit thereof. Tubing of widely varied size and diameter may be readily joined by this method and the dimensions of the various elements thereof may be varied within wide ranges.

The invention may be readily adapted to rod and pipe joints and may be modified to be adapted to rectangular tubing and tubing of various other cross-sections, for example, elliptical tubing or tubing of other than a circular cross-section.

If desired, the tube sections may be welded or otherwise cemented together, thus eliminating the bolts, where a permanent non-weave joint is required.

The length of the concave terminal sections may be varied at will, as may the number of bolts employed, depending upon the size of the tubing and the strength required of the coupling.

This specification is by way of illustration of one embodiment of the invention only and attention is directed to the appended claims for a limitation of its scope.

What is claimed is:

1. In a coupling for tubing sections, corresponding concaved extremities on each tubing section of a cross-sectional curvature conforming to the curvature of the tubing, conforming curved shoulders at the inner extremities of said concaved sections, aligned bores through said concaved sections and the bodies of the tubing sections receiving bolts to maintain the coupling in rigid condition when said concaved sections are respectively fitted over the corresponding surfaces of the tubing sections with their respective inner shoulders in close engagement.

2. In a coupling for tubing sections, corresponding concaved extremities on each tubing section of a cross-sectional curvature conforming to the curvature of the tubing, mating curved shoulders at the inner extremities of said concaved sections, aligned bores through said concaved sections and the bodies of the tubing sections receiving bolts to maintain the coupling in rigid condition when said concaved sections are respectively fitted over the corresponding surfaces of the tubing sections with their respective inner shoulders in close engagement.

3. In a coupling for tubing sections, corresponding concaved extremities on each tubing section of a cross-sectional curvature conforming to the curvature of the tubing, conforming curved shoulders at the inner extremities of said concaved sections, aligned bores through said concaved sections and the bodies of the tubing sections receiving retaining means to maintain the coupling in rigid condition when said concaved sections are respectively fitted over the corresponding surfaces of the tubing sections with their respective inner shoulders in close engagement.

4. In a coupling for tubing sections, corresponding concaved extremities on each tubing section of a cross-sectional curvature conforming to the curvature of the tubing, conforming curved shoulders at the inner extremities of said concaved sections, retaining means to maintain the coupling in rigid condition when said concaved sections are respectively fitted over the corresponding surfaces of the tubing sections with their respective inner shoulders in close engagement.

5. In a coupling for tubing formed between two segments thereof, corresponding concave extremities provided on each tubing section, mating internal shoulders defined at the inner extremities of said concave sections, bores through said tubing sections, bolts fitting through said bores whereby a non-weave joint is effected between the two tubing sections when the correspondnig concave extremities are fitted over the cylindrical portions thereof with the internal shoulders in close contact.

6. In a coupling for tubing formed between two segments thereof, corresponding elongate concave extremities provided on each tubing section, mating internal shoulders defined at the inner extremities of said concave sections, bores through said tubing sections, bolts fitting through said bores whereby a non-weave joint is effected between the two tubing sections when the corresponding concave extremities are fitted over the cylindrical portions thereof with the internal shoulders in close contact.

7. In a coupling for two tubing sections, corresponding concaved sections at the outer extremities of said sections of a curvature closely fitting the outer periphery of said tubing, internal curved and mating shoulders at the inner extremities of said concave sections, aligned bores through said concave and cylindrical sections, bolts fitting said bores when said sections are mated whereby a rigid, non-weave junction is effected between the two sections.

References Cited in the file of this patent

UNITED STATES PATENTS

| | | |
|---|---|---|
| 426,500 | Hockman | Apr. 29, 1890 |
| 2,408,907 | Booth | Oct. 8, 1946 |